(12) United States Patent  
Lager

(10) Patent No.: US 10,766,139 B2  
(45) Date of Patent: Sep. 8, 2020

(54) METHOD FOR AVOIDING COLLISIONS BETWEEN TWO ROBOTS

(71) Applicant: ABB Schweiz AG, Baden (CH)

(72) Inventor: Anders Lager, Västerås (SE)

(73) Assignee: ABB Schweiz AG, Baden (CH)

( * ) Notice: Subject to any disclaimer, the term of this patent is extended or adjusted under 35 U.S.C. 154(b) by 190 days.

(21) Appl. No.: 15/549,889

(22) PCT Filed: Feb. 13, 2015

(86) PCT No.: PCT/EP2015/053101  
§ 371 (c)(1),  
(2) Date: Aug. 9, 2017

(87) PCT Pub. No.: WO2016/128066  
PCT Pub. Date: Aug. 18, 2016

(65) Prior Publication Data  
US 2018/0029233 A1 Feb. 1, 2018

(51) Int. Cl.  
*B25J 9/16* (2006.01)

(52) U.S. Cl.  
CPC ... *B25J 9/1676* (2013.01); *G05B 2219/39135* (2013.01); *G05B 2219/40497* (2013.01); *G05B 2219/45063* (2013.01)

(58) Field of Classification Search  
CPC .......... G05B 2219/39135; G05B 2219/40497; G05B 2219/45063  
See application file for complete search history.

(56) References Cited

U.S. PATENT DOCUMENTS 8,527,091 B2* 9/2013 Bosscher .......... B25J 9/1676  
                                                   700/245  
10,131,053 B1* 11/2018 Sampedro .......... B25J 9/1666  
(Continued)

FOREIGN PATENT DOCUMENTS

CN        102523737 A    6/2012  
DE    102012103830 A1   11/2012  
(Continued)

OTHER PUBLICATIONS

Basta R A et al: "Collision detection for planning collision-free motion of two robot arms", Proceedings of the International Conference on Robotics and Automation. Philadelphia, Apr. 24-29, 1988; [Proceedings of the International Conference on Robotics and Automation]. Washington, IEEE Comp. Soc. Press, US, vol. -, Apr. 24, 1988 (Apr. 24, 1988), pp. 638-640.

(Continued)

*Primary Examiner* — Robert T Nguyen  
(74) *Attorney, Agent, or Firm* — Whitmyer IP Group LLC

(57) ABSTRACT

A method for avoiding collisions between two robots providing first movement information related to a first robot movement; determining for a plurality of second robot movements whether they involve a risk for collision between the first and second robots; and executing one of the second robot movements. Information about a movement of one robot enables a robot controller of another robot with an overlapping work area to select among available robot movements an appropriate one that does not involve a risk for collision between the two robots.

16 Claims, 2 Drawing Sheets

(56) References Cited

U.S. PATENT DOCUMENTS

| | | | |
|---|---|---|---|
| 2003/0100957 A1 | 5/2003 | Chaffee et al. | |
| 2005/0273200 A1 | 12/2005 | Hietmann et al. | |
| 2008/0027591 A1* | 1/2008 | Lenser | G05D 1/0251 |
| | | | 701/2 |
| 2009/0326711 A1* | 12/2009 | Chang | B25J 9/1666 |
| | | | 700/248 |
| 2012/0165972 A1* | 6/2012 | Wappling | B25J 9/1687 |
| | | | 700/213 |
| 2013/0110288 A1 | 5/2013 | Cassano et al. | |
| 2014/0230594 A1 | 8/2014 | De Bie | |
| 2015/0190926 A1* | 7/2015 | Miegel | B25J 9/1682 |
| | | | 700/248 |
| 2015/0251315 A1* | 9/2015 | Brandenberger | B25J 9/1676 |
| | | | 700/255 |
| 2018/0178382 A1* | 6/2018 | Lalonde | B25J 9/1666 |

FOREIGN PATENT DOCUMENTS

| | | |
|---|---|---|
| EP | 2610036 B1 | 2/2015 |
| JP | 2001022416 A | 1/2001 |
| WO | 2012031635 A1 | 3/2012 |
| WO | 2012031954 A1 | 3/2012 |

OTHER PUBLICATIONS

International Search Report & Written Opinion of the International Searching Authority Application No. PCT/EP2015/053101 Completed: Aug. 10, 2015; dated Aug. 19, 2015 10 pages.

Yuh J ED—Institute of Electrical and Electronics Engineers: "On-Line Adaptive Collision Avoidance Motion Control Strategy for Two Planar Robots". Proceedings of the International Conference on Systems. Man, and Cybernetics. Alexandria, VA., Oct. 20-23, 1987; [Proceedings of the International Conference on Systems, Man, and Cybernetics]. New York, IEEE, US, vol. vol. 1 of 3, No. 1987, pp. 21-25.

Chinese Office Action, Search Report and Translation Application No. 201580075108 Completed: Aug. 2, 2019 8 pages.

\* cited by examiner

METHOD FOR AVOIDING COLLISIONS BETWEEN TWO ROBOTS

TECHNICAL FIELD

The present invention relates to a collision avoidance in a robot system comprising robots having overlapping work areas.

BACKGROUND

In the present disclosure the term "work area" is used to designate a volume within which a robot tool can operate, the volume being constrained by mechanical structure of the robot. It is previously known to avoid collisions between robots by separating them enough such that their work areas do not overlap. However, such robot system has the drawback that the footprint of the same becomes large. To decrease the footprint, the robots are brought closer to each other such that their work areas do overlap. Different solutions are provided to avoid collisions in robot systems with overlapping work areas. For example, working ranges of the robots can be limited by software to be smaller than the work areas. Buffer zones within which robots are not allowed to operate can thereby be defined between the robots such that they never can collide with each other. However, in such robot system the robots' work areas are not utilized in full. Another drawback is that no operations can be performed within the buffer zones.

US20050273200A1 discloses a robot system where work areas of robots overlap. Collisions between the robots are avoided by prohibiting two robots from entering the overlapping part of their work areas simultaneously. A drawback with this solution is that the robots' capacities are not utilized in full, especially so if the overlapping areas are large.

US20140230594A1 discloses a robot system where work areas of robots overlap. Collisions between the robots are avoided by controlling the robots appropriately with a central robot controller. No details are given how this is done, but e.g. the method disclosed in US20050273200A1 could be utilized.

There remains a desire to improve the existing robot systems such that the footprints of the same are kept small while better use is made of the robots' capacities.

SUMMARY

One object of the invention is to provide an improved method for avoiding collisions between two robots, which method allows two robots to operate simultaneously within an overlapping work area without a risk for collision between the two robots.

A further object of the invention is to provide an improved robot system for carrying out a pick and place task.

The invention is based on the realization that in a robot system configured to carry out a pick and place task each robot oftentimes has a plurality of available robot movements that can be executed depending on which item to pick or at which empty place to place an item. Information about a movement of one robot enables a robot controller of another robot with an overlapping work area to select among available robot movements an appropriate one that does not involve a risk for collision between the two robots.

According to a first aspect of the invention, there is provided a method for avoiding collisions between two robots in a robot system comprising a first robot having a first work area and a second robot having a second work area, the first work area overlapping with the second work area to thereby define an overlapping work area. The method comprises the steps of: providing first movement information related to a first robot movement which is to be executed by the first robot; retrieving the first movement information; determining for a plurality of second robot movements whether they involve a risk for collision between the first and second robots; and executing one of the second robot movements.

According to one embodiment of the invention, the method allows the first and second robots to simultaneously operate within the overlapping work area.

According to one embodiment of the invention, the first movement information comprises at least one position of the first robot.

According to one embodiment of the invention, the first movement information comprises a first start position and a first end position.

According to one embodiment of the invention, the first movement information further comprises a path between the first start position and the first end position.

According to one embodiment of the invention, the first and second robots are configured to carry out a pick and place task such that at each point of time the number of available robot movements is related to the number of respective items or empty places that are within or are about to be within the work area of the respective robot, and the plurality of second robot movements is selected among the available robot movements.

According to one embodiment of the invention, the plurality of second robot movements comprises all available robot movements.

According to one embodiment of the invention, the method further comprises the step of saving the first movement information in a digital memory.

According to one embodiment of the invention, the method further comprises the step of removing the first movement information from the digital memory.

According to a second aspect of the invention, there is provided a robot system configured to carry out a pick and place task. The robot system comprises a first robot having a first work area and a second robot having a second work area, the first work area overlapping with the second work area to thereby define an overlapping work area, and at least one robot controller for controlling movements of the first and second robots. The robot controller is configured to execute a method according to any of the aspects and embodiments of the invention disclosed hereinbefore.

BRIEF DESCRIPTION OF THE DRAWINGS

The invention will be explained in greater detail with reference to the accompanying drawings, wherein.

DETAILED DESCRIPTION

Figure 1:
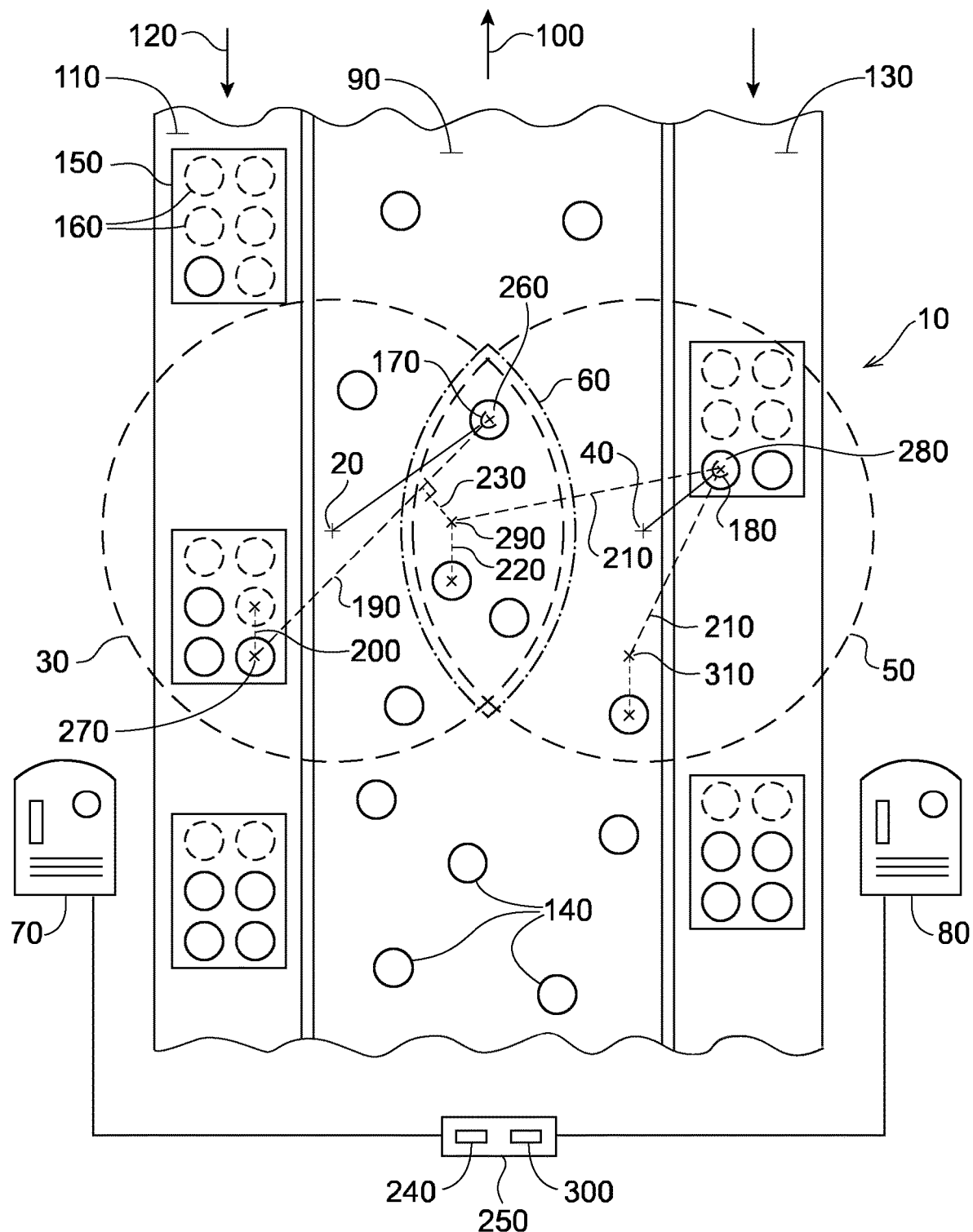
FIG. 1 shows a schematic view of a robot system according to one embodiment of the invention.

Referring to FIG. 1, a robot system 10 according to one embodiment of the invention comprises a first robot 20 having a first work area 30, and a second robot 40 having a second work area 50. The first work area 30 overlaps with the second work area 50 to thereby define an overlapping work area 60. A first robot controller 70 controls movements of the first robot 20, and a second robot controller 80 controls movements of the second robot 40.

The robot system 10 further comprises a product conveyor 90 moving in a first direction 100, a first container conveyor 110 moving in a second direction 120, and a second container conveyor 130 also moving in the second direction 120. The second direction 120 in opposite to the first direction 100. The product conveyor 90 transports on it items 140 randomly distributed over the length and width of the product conveyor 90. The first and second container conveyors 110, 130 transport on them containers 150 comprising places 160 for the items 140. The places 160 are herein called either empty places 160 or occupied places 160 depending on whether they are occupied by items 140 or not. The items 140 are to be picked from the product conveyor 90 and placed at empty places 160 within the containers 150 in a pick and place task carried out by the first and second robots 20, 40. The carrying out of the pick and place task implies appropriate controls by the first and second robot controllers 70, 80. In order to provide appropriate controls the first and second robot controllers 70, 80 need to know positions of the items 140 on the product conveyor 90 as well as of empty places 160 that are within or are about to be within the respective first and second work areas 30, 50. Such information can be provided by a machine vision system (not shown) determining positions of the items 140 and empty places 160 in relation to the respective conveyors 90, 110, 130, and by conveyor controllers determining the speeds of the respective conveyors 90, 110, 130.

Figure 2:
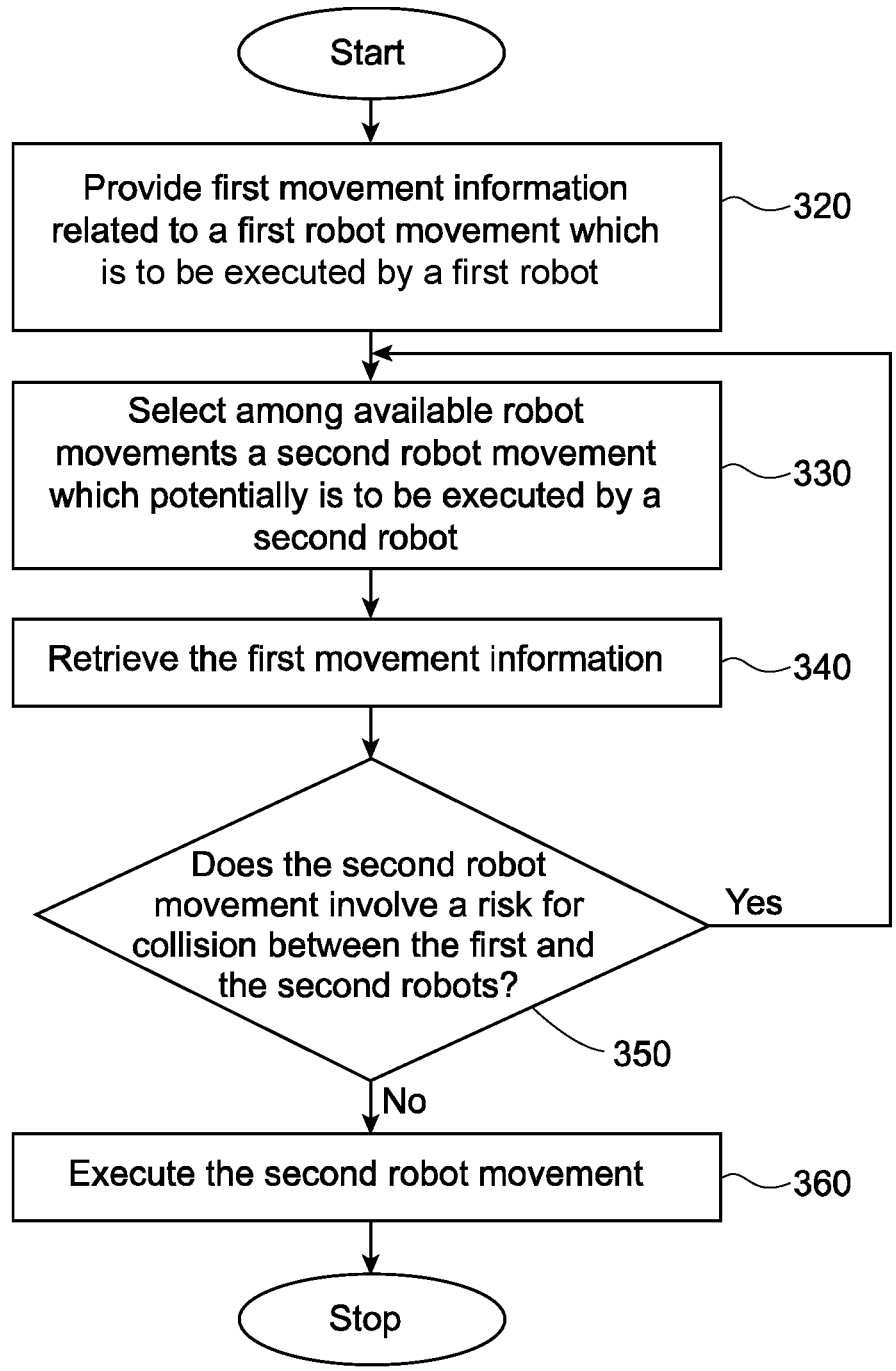
FIG. 2 shows one embodiment of the invention in the form of a flowchart.

Referring to FIGS. 1 and 2, at each point of time each of the first and second robots 20, 40 has a number of available robot movements that, if executed 360, contribute to the carrying out of the pick and place task. An "available robot movement" in this context typically means a robot movement 190, 210 that is related either to picking or to placing of an item 140. There may also exist some exceptional robot movements that are also considered as available robot movements although they are neither related to picking nor to placing of an item 140. An example of such exceptional robot movement is a robot movement 190, 210 to a particular waiting position as explained further down in the description. At each point of time the number of available robot movements is related to the number of respective items 140 or empty places 160 that are within or are about to be within the respective first and second work areas 30, 50. The first and second robot controllers 70, 80 can at each point of time select 330 a robot movement 190, 210 among the available robot movements.

In the case of a situation illustrated in FIG. 1 it is assumed that a first robot gripper 170 has just picked an item 140 while a second robot gripper 180 is just about to place an item 140. Let's assume that the speed of the first container conveyor 110 is such that the first robot 20 is able to place the picked item 140 in any of the empty places 160 within the middlemost container 150 on the first container conveyor 110, or to any of the empty places 160 within the uppermost container 150 on the first container conveyor 110. The first robot 20 thereby has eight available robot movements (in addition to eventual exceptional robot movements) at the point of time shown in FIG. 1. Let's further assume that the first robot controller 70 selects 330 to execute 360 a first robot movement 190 with a first start position 260 and a first end position 270 to place the picked item 140 at the middlemost place 160 to the right within the middlemost container 150 on the first container conveyor 110. A first distance 200 illustrates a displacement of the first container conveyor 110 during the first robot movement 190. Correspondingly, let's assume that the speed of the product conveyor 90 is such that the second robot 40 is able to pick any of the three free items 140 currently within the second work area 50 and the three items 140 that are about to be within the second work area 50. The second robot 40 thereby has six available robot movements (in addition to eventual exceptional robot movements) after it placed the item 140 it is about to place.

The first and second robot controllers 70, 80 may apply different strategies for selecting 330 between the available robot movements. For example, a robot controller 70, 80 may give priority to those items 140 and empty places 160 that are about to leave the respective work area, or it can select 330 the shortest one of the available robot movements. However, considerations regarding the order of selection between the available robot movements are not relevant for the present invention. Any previously known picking strategy, such as that disclosed in US20120165972A1, can be applied mutatis mutandis in combination with the present invention.

There is a risk for collisions between the first and second robots 20, 40 when both of the two operate within the overlapping work area 60. To avoid collisions the first robot controller 70 provides 320 first movement information 240 related to the first robot movement 190 by saving it in a communication interface 250, such as a computer memory, to which both the first and second robot controllers 70, 80 have access. The first movement information 240 may comprise the first start position 260 and/or the first end position 270, and a path between the first start position 260 and the first end position 270.

Continuing from the point of time shown in FIG. 1, after the second robot 40 placed the item 140 it is about to place, the second robot controller 80 selects 330 one of the six available robot movements to be a second robot movement 210. Let's assume that the second robot controller 80 selects 330 a second robot movement 210 with a second start position 280 and a second end position 290 to pick the leftmost item 140 within the second work area 50. A second distance 220 illustrates a displacement of the product conveyor 90 during the second robot movement 210.

In order to assess the suitability of the second robot movement 210 from the collision risk point of view the second robot controller 80 retrieves 340 the first movement information 240 from the communication interface 250. It then applies an appropriate criteria to determine 350 whether the second robot movement 210 involves a risk for collision between the first and second robots 20, 40. If the second robot controller 80 determines 350 that executing 360 the second robot movement 210 does not involve a risk for collision between the first and second robots 20, 40, it executes 360 the second robot movement 210. Otherwise it selects 330 one of the five (unless the number of available robot movements has changed meanwhile) remaining available robot movements to be the second robot movement 210. The second robot controller 80 then repeatedly retrieves 340 the first movement information 240 (which may have changed since it was last retrieved 340) from the communication interface 250, determines 350 whether the second robot movement 210 risks to cause a collision between the first and second robots 20, 40, and selects 330 another available robot movement to be the second robot movement 210 until the second robot movement 210 is executed 360.

Although according to a preferred embodiment the second robot controller 80 retrieves 340 the first movement information 240 from the communication interface 250 for each occasion of determining 350 whether the second robot movement 210 risks to cause a collision between the first and second robots 20, 40, it is not crucial that this retrieval 340 is carried out in every "loop". Alternatively, the second robot controller 80 may only retrieve the first movement information 240 once, and carry out the determination 350 with regard to each second robot movement 210 against the same first movement information 240 until one of the second robot movements 210 is executed. This is especially true as the time the second robot controller 80 needs to carry out the determination 350 for all available robot movements is probably negligible in relation to physical movements of the first robot 20. Yet alternatively, the second robot controller 80 may retrieve the first movement information 240 at certain time intervals.

An appropriate criteria for assessing the risk for collision may comprise calculating a minimum distance 230 between the first and second robot movements 190, 210 (provided that the path of the first robot movement 190 is included into the first movement information 240), and comparing this minimum distance 230 with a predetermined threshold value. Another suitable criteria may be the smallest distances of respective start and end positions 260, 280, 270, 290, 310 of robot movements 190, 210 in certain directions within the overlapping work area 60. For example, in the case of a situation illustrated in FIG. 1 it may be determined 350 that there is no risk for collision if the first start position 260 and the second end position 290 are at least 30 cm apart in a direction parallel to the first direction 100. Building further on the same example, it may furthermore be determined 350 that even if the first start position 260 and the second end position 290 are less than 30 cm apart in the direction parallel to the first direction 100, then there is still no risk for collision if the first start position 260 and the second end position 290 are at least 10 cm apart in a direction perpendicular to the first direction 100, and the first start position 260 is to the left from the second end position 290. Appropriate criteria for the risk for collision can be appointed depending on the application, especially on the dimensions of the robots 20, 40 (grippers 170, 180) and of the items 140 to be picked.

Let's further assume that the second robot controller 80 determines 350 that the second robot movement 210 with a second start position 280 and a second end position 290 involves a risk for collision between the first and second robots 20, 40 because the minimum distance 230 is under a predetermined threshold value. The second robot controller 80 then selects 330 one of the five remaining available robot movements to be the second robot movement 210. Thereafter the second robot controller 80 repeats the steps of retrieving 340 the first movement information 240, determining 350 whether the second robot movement 210 involves a risk for collision between the first and second robots 20, 40, and selecting 330 another available robot movement to be the second robot movement 210 until it determines 350 that the second robot movement 210 does not involve a risk for collision. The second robot controller 80 then executes 360 the second robot movement 210, which in the case of the situation illustrated in FIG. 1 may e.g. end up with being the second robot movement 210 with the second start position 280 and a third end position 310 to pick the rightmost item 140 within the second work area 50. As soon as the second robot controller 80 starts to execute 360 a certain second robot movement 210, it provides 320 second movement information 300 related to the second robot movement 210 by saving it in the communication interface 250 for the first robot controller 70 to retrieve 340.

It is important to make sure that there is an appropriate dependency between the steps of providing 320 and retrieving 340 of movement information 240, 300 regarding robot movements 190, 210 within the overlapping work area 60. It shall for example not be possible that the first robot controller 70 provides 320 a "new" first movement information 240 while the second robot controller 80 uses an "old" first movement information 240 for determining 350 whether the second robot movement 210 risks to cause a collision between the first and second robots 20, 40. Such situation can be avoided by making the second robot controller 80 to check out both the first movement information 240 and the second movement information 300 at retrieval 340 such that they cannot be provided 320 or retrieved 340, respectively, by the first robot controller 70 until they are checked in again by the second robot controller 80. The check in may occur as soon as the second robot controller 80 has provided 320 the second movement information 300.

The first robot controller 70 takes in its turn corresponding steps that those described hereinbefore for the second robot controller 80, and the both robot controllers 70, 80 continuously change roles so that the pick and place task continues with no risk for collision between the two robots 20, 40.

It is to be noted that at some point of time the number of available robot movements may be zero, or that none of the available robot movements can be executed 360 because of a risk for collision. In such case the respective robot 20, 40 stands still, and the respective robot controller 70, 80 keeps selecting 330 among the available robot movements (as soon as there are any) until one of them can be executed 360. Alternatively, the respective robot 20, 40 can be moved to a particular waiting position. By this measure it can especially be avoided that a robot gripper 170, 180 stands still within the overlapping work area 60. A robot movement 190, 210 to a particular waiting position can be considered to be an available robot movement although it is neither related to picking nor to placing of an item 140. Such robot movement 190, 210 takes place only in the exceptional situation that no other available robot movements exist.

As soon as a robot 20, 40 reaches an end position 270, 290, 310 of a robot movement 190, 210, any movement information 240, 300 except the end position 270, 290, 310 (which becomes a start position 260, 280 of a next robot movement 190, 210) related to that robot movement 190, 210 can be removed from the communication interface 250.

The invention is not limited to the embodiments shown above, but the person skilled in the art may modify them in a plurality of ways within the scope of the invention as defined by the claims. Thus, the invention is not limited to a robot system 10 comprising only two robots 20, 40, but may be applied to a robot system 10 comprising any suitable number of robots 20, 40. Moreover, individual robots 20, 40 do not necessarily need to be controlled by individual robot controllers 70, 80, but a common robot controller 70, 80 may control a plurality of robots 20, 40. The communication interface 250 may be an integral part of a robot controller 70, 80.

The invention claimed is:

1. A method for avoiding collisions between two robots in a robot system comprising a first robot having a first work area and a second robot having a second work area, the first work area overlapping with the second work area to thereby define an overlapping work area, the method comprising the steps of:

providing first movement information related to a first robot movement which is being executed by the first robot;

retrieving the first movement information;

determining for a plurality of second robot movements by the second robot whether the second robot movements involve a risk for collision between the first and second robots using the first movement information related to the first robot executing the first robot movement; and executing one of the second robot movements which has been determined to involve no risk for collision between the first and second robots wherein the first and second robots are configured to carry out a pick and place task such that at each point of time a number of available robot movements is related to a number of respective items or empty places that are within or are about to be within the work area of the respective robot, and the plurality of second robot movements is selected among the available robot movements.

2. The method according to claim 1, wherein the method allows the first and second robots to simultaneously operate within the overlapping work area.

3. The method according to claim 1, wherein the first movement information comprises at least one position of the first robot.

4. The method according to claim 3, wherein the first movement information comprises a first start position and a first end position.

5. The method according to claim 4, wherein the first movement information further comprises a path between the first start position and the first end position.

6. The method according to claim 1, wherein the method further comprises the step of saving the first movement information in a digital memory.

7. The method according to claim 6, wherein the method further comprises the step of removing the first movement information from the digital memory.

8. The method according to claim 2, wherein the first movement information comprises at least one position of the first robot.

9. The method according to claim 2, wherein the first and second robots are configured to carry out a pick and place task such that at each point of time the number of available robot movements is related to the number of respective items or empty places that are within or are about to be within the work area of the respective robot, and the plurality of second robot movements is selected among the available robot movements.

10. The method according to claim 2, wherein the method further comprises the step of saving the first movement information in a digital memory.

11. The method according to claim 1, further comprising:

retrieving the first movement information whenever one of the second robot movements has been determined to involve a risk for collision and before another of the second robot movements is evaluated for risk of collision, wherein said retrieval is repeated until one of the second robot movements has been determined to involve no risk for collision.

12. The method according to claim 1, wherein said determining whether the second robot movements involve a risk for collision comprises calculating a minimum distance between the first and second robot movements and comparing the minimum distance with a predetermined threshold value.

13. The method according to claim 4, wherein:

each second robot movement comprises a second start position and a second end position; and said determining whether the second robot movements involve a risk for collision comprises determining a smallest distance between the first start and end positions and the second start and end positions of the respective second robot movement in a specified direction within the overlapping work area.

14. A method for avoiding collisions between two robots in a robot system comprising a first robot having a first work area and a second robot having a second work area, the first work area overlapping with the second work area to thereby define an overlapping work area, the method comprising the steps of:

providing first movement information related to a first robot movement which is to be executed by the first robot;

retrieving the first movement information;

determining for a plurality of second robot movements by the second robot whether the second robot movements involve a risk for collision between the first and second robots; and executing one of the second robot movements, wherein the first and second robots are configured to carry out a pick and place task such that at each point of time a number of available robot movements is related to a number of respective items or empty places that are within or are about to be within the work area of the respective robot, and the plurality of second robot movements is selected among the available robot movements, wherein the plurality of second robot movements comprises all available robot movements.

15. A robot system configured to carry out a pick and place task, the robot system comprising:

a first robot having a first work area and a second robot having a second work area, the first work area overlapping with the second work area to thereby define an overlapping work area, and at least one robot controller for controlling movements of the first and second robots, wherein the robot controller is configured to execute a method comprising the steps of:

providing first movement information related to a first robot movement which is being executed by the first robot;

retrieving the first movement information;

determining for a plurality of second robot movements by the second robot whether the second robot movements involve a risk for collision between the first and second robots using the first movement information related to the first robot executing the first robot movement; and executing one of the second robot movements which has been determined to involve no risk for collision between the first and second robots wherein the first and second robots are configured to carry out a pick and place task such that at each point of time a number of available robot movements is related to a number of respective items or empty places that are within or are about to be within the work area of the respective robot, and the plurality of second robot movements is selected among the available robot movements.

16. The robot system according to claim 15, comprising a first controller for controlling movement of the first robot, a second controller for controlling movement of the second robot, and a communications interface to which the first and second controllers have access;

wherein the first robot controller provides said first movement information to said communications interface, and the second robot controller retrieves the first movement information from said communications interface.

\* \* \* \* \*